Jan. 2, 1968     W. J. COOK     3,361,498
BEARING ARRANGEMENT
Filed Sept. 21, 1965
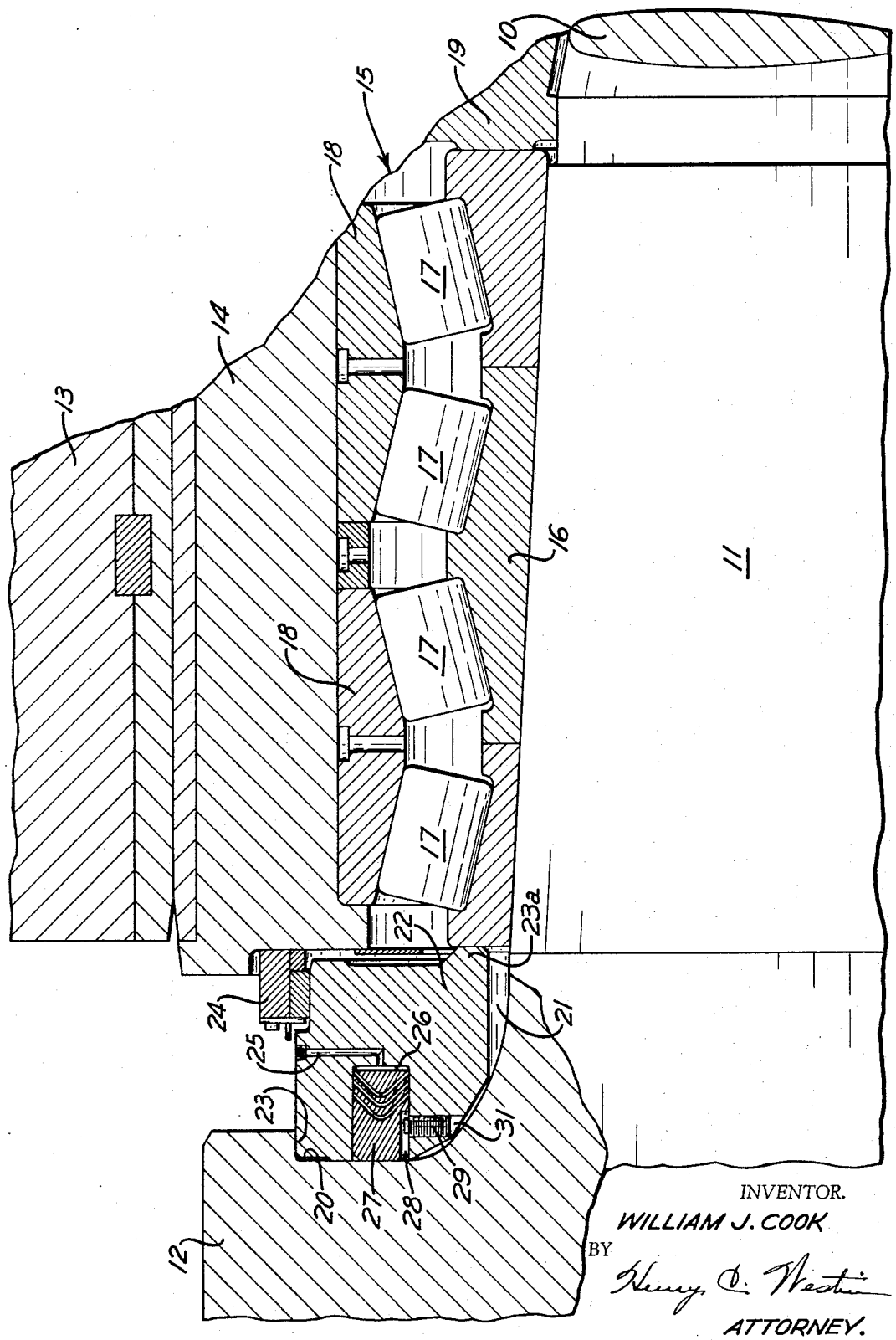
INVENTOR.
WILLIAM J. COOK
BY
ATTORNEY.

United States Patent Office 3,361,498
Patented Jan. 2, 1968

3,361,498
BEARING ARRANGEMENT
William John Cook, Pittsburgh, Pa., assignor to United Engineering and Foundry Company, Pittsburgh, Pa., a corporation of Pennsylvania
Filed Sept. 21, 1965, Ser. No. 488,856
Claims priority, application Great Britain, Oct. 27, 1964, 43,850/64
2 Claims. (Cl. 308—189)

ABSTRACT OF THE DISCLOSURE

The present invention relates to a shaft and of a bearing assembly, such as, a rolling mill roll and its bearing and comprises a force exerting means arranged between the shaft and the bearing in the form of a piston cylinder assembly arranged to rotate with the roll and bearing and adapted upon admission of pressurized fluid to force the bearing off the roll when it is desired to remove the bearing therefrom.

---

The present invention relates to an improved bearing assembly and, more particularly, to a bearing arrangement which has the facility of allowing quick removal of the bearing from its supporting journal.

For purposes of describing the invention, although it will be appreciated that it has many other applications, its utilization in connection with bearings of the type employed to support a rolling mill roll has been selected. Rolling mill rolls are commonly supported by roller bearings, wherein the inner race of the bearing, which may be tapered, is shrunk or press fitted onto the journal of the roll. This construction has posed difficulties in the replacement of the bearings and/or rolls in view of the press fit between the bearing and the journal of the roll.

The prior art attempt, providing a means for quickly and expeditiously removing the bearing from the journal, is exemplified in U.S. Patent No. 2,564,670 which issued to A. E. Bratt on Aug. 21, 1951, U.S. Patent No. 2,817,142 which issued to E. G. Boden et al. on Dec. 24, 1957, and U.S. Patent No. 2,980,474 which issued to E. R. Gargan on Apr. 18, 1961. These patents are addressed to the concept of introducing a medium under pressure, such as a fluid, between the contacting surfaces of the bearing and roll journal so that the metallic contact therebetween is relieved over at least an appreciable part of the contacting surface, whereby the bearing can be easily and quickly moved relative to the journal of the roll. In these patents the fluid is admitted under pressure to the contacting surfaces of the bearing and roll journal by passageways formed in the interior of the journal.

Such an arrangement for conveying the pressurized fluid is quite permissible in certain applications. In certain types of rolling mills, however, where the rolls thereof are to be subject to additional pressure other than what they normally would be exposed to, such as the imposing of bending moments to control the crowns of the rolls, the internal passageways formed in the roll journal create a serious problem of stress concentrations. For this reason the strength of the roll journals is extremely critical and there is a great need for an arrangement which will alleviate the necessity of providing passageways, such as horizontal and radial holes in the roll journals as exemplified by the foregoing patents.

It is the object of the present invention to provide in combination with a bearing that supports a rotating member, a pressure-exerting means engageable with a member other than the bearing for forcing the bearing relative to a rotating member to facilitate its removal therefrom.

It is another object of this invention to provide as an integral part of a bearing assembly, a pressure-exerting member, such as an hydraulic piston cylinder assembly, which is carried by the member supported by the bearing and arranged to engage a portion of the bearing so that on operation it will force the bearing relative to the supporting member.

It is another object of this invention to provide in combination with a bearing of the type, for example, employed in conjunction with a rolling mill, means for moving the bearing relative to the journal of the roll, which means consist of a piston cylinder assembly, the cylinder of which constitutes a member engageable with the bearing and which transfers the thrust forces imposed on the roll to the bearing.

It is a further object of the invention to provide, in combination with a tapered roller bearing designed to withstand both thrust and radial loads, means for moving the bearing relative to the rotatable member supported thereby, which means consist of a ring arranged between the bearing and the portion of the rotatable member supported by the bearing, said ring having a cavity into which there is received a piston, one end of the piston engaging the member supported by the bearing, means for conveying fluid under pressure to said piston so as to displace said ring relative to said member and cause said bearing to move relative to said member, said ring being so constructed and positioned relative to said member and said bearing so as to transfer thrust forces generated in the member upon the normal rotation of said member to the bearing.

These objects, as well as others, will be more readily understood when the following specification is read along with the accompanying drawing, of which:

The drawing comprises a sectional view of the bearing chock assembly employed in conjunction with a rolling mill roll.

In order to describe in detail the elements illustrated in the drawing, it is to be appreciated that the bearing shown therein is similar to several commercially available bearings, such as the bearing manufactured by the Timken Roller Bearing Company, identified by their number TQIT and illustrated in "The Timken Engineering Journal," copyright 1963, page A–19.

The drawing illustrates a rolling mill roll 10, its essential parts consisting of a tapered journal portion 11 and a rolling portion 12. The end of the roll 10 is received in one of two housings 13, only a portion of one housing being shown in the drawing, the roll itself being rotatably received in a chock 14 which, in turn, receives a bearing 15 onto which the journal 11 of the roll 10 is received and supported. The bearing 15 has an inner race 16, the inner surface of which has a taper to match the taper of the journal 11. The illustrated bearing 15 is a four-roller type having rollers identified as 17 which are received in the inner race 16 on the one hand, and in the outer race 18 on the other hand. The outer race is secured to the chock 14 in the customary manner. As shown at the right of the drawing, the bearing 15 is held at the outboard end of the roll 10 by a ring 19, a portion of which is only shown. A complete illustration of the entire roll chock assembly including the ring 19 can be seen in referring to U.S. Patent No. 1,824,002 which issued to S. M. Weckstein on Sept. 22, 1931.

Turning now to the inboard end of the bearing 15, it will be noted that the roll body 12 is provided with a cavity 20 and that there exists between the vertical face of the roll body 12, the bearing 15 and chock 14, an opening 21. Within this opening there is provided a circumferentially shaped ring 22, the left side being formed with a collar 23 which fits in the cavity 20 of the roll body 12. The opposite end of the ring 22 is provided with a shoulder 23a which engages the inner race 16 of the bearing 15. Moving directly to the top of the ring 22, there is secured thereto a sealing ring 24 that engages the chock 14. Still referring to the top of the ring 22, as illustrated in the drawing, there is provided a vertical passageway 25 which communicates with a horizontally formed cavity 26 that extends in the direction of the roll body 12. Within the cavity there is provided a piston 27, the outer face of which engages the roll body 21. At the lower side of the piston 27 there is a slot 28 which receives the upper end of a set screw 29 received in a threaded bore 31 formed in the ring 22. The set screw 29 is employed to prevent the piston 27 from falling out of the ring during its assembly.

It should be pointed out at this point that the ring 22 has two basic functions, the first function is to serve as a thrust ring for transferring the axial thrust load from the roll body 12 to the roller bearing 15. The second function is that it serves as the cylinder of a piston cylinder assembly whereby on admitting fluid, such as oil or grease, to the passageway 25, the piston 27 being held by the roll body 12 causes the ring 22 itself to act as a movable member and to apply a force against the inner race 16 of the bearing 15. When this occurs, assuming that the ring 19 has been removed, the bearing 15 will be forced and displaced axially relative to the journal 11 of the roll 10, a sufficient distance to break the press fit that exists between the bearing and the journal, whereupon the bearing is free to be removed with ease.

While the present invention has been illustrated in conjunction with a bearing and, particularly, a roller bearing, it will be appreciated that the present invention can be applied to other applications where there is the requirement of moving one member relative to a second member.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:
1. A shaft and anti-friction bearing assembly comprising in combination a shaft having a tapered journal portion and an inboard body portion.
   a bearing having a rotatable member mounted on said journal portion of said shaft and having a taper similar to the journal portion and a non-rotating member,
   force exerting means for moving said bearing relative to said tapered journal,
   said force exerting means comprising an element interposed between the inboard end of said bearing and said roll body portion of said shaft and having a portion in engagement with one of said bearing members,
   said element having a cavity into which there is received a ram, one end of said ram being arranged to engage said body portion of said shaft, and
   a channel formed in said element for admission of pressurized fluid against one side of said ram to cause said element to be displaced relative to said shaft and force said bearing to move relative to said journal to free the bearing from the journal.
2. A shaft and anti-friction bearing assembly in accordance with claim 1 wherein said element comprises:
   an annular ring and wherein said ring includes a thrust transmitting portion in engagement with the rotatable member of said bearing, and
   further wherein said ram comprises a piston and said ring comprises the cylinder of a piston cylinder assembly.

References Cited

UNITED STATES PATENTS

| 1,824,002 | 9/1931 | Weckstein | 308—207 |
| 3,304,139 | 2/1967 | Toth et al. | 308—236 |

MARTIN P. SCHWADRON, *Primary Examiner.*

FRANK SUSKO, *Examiner.*